UNITED STATES PATENT OFFICE.

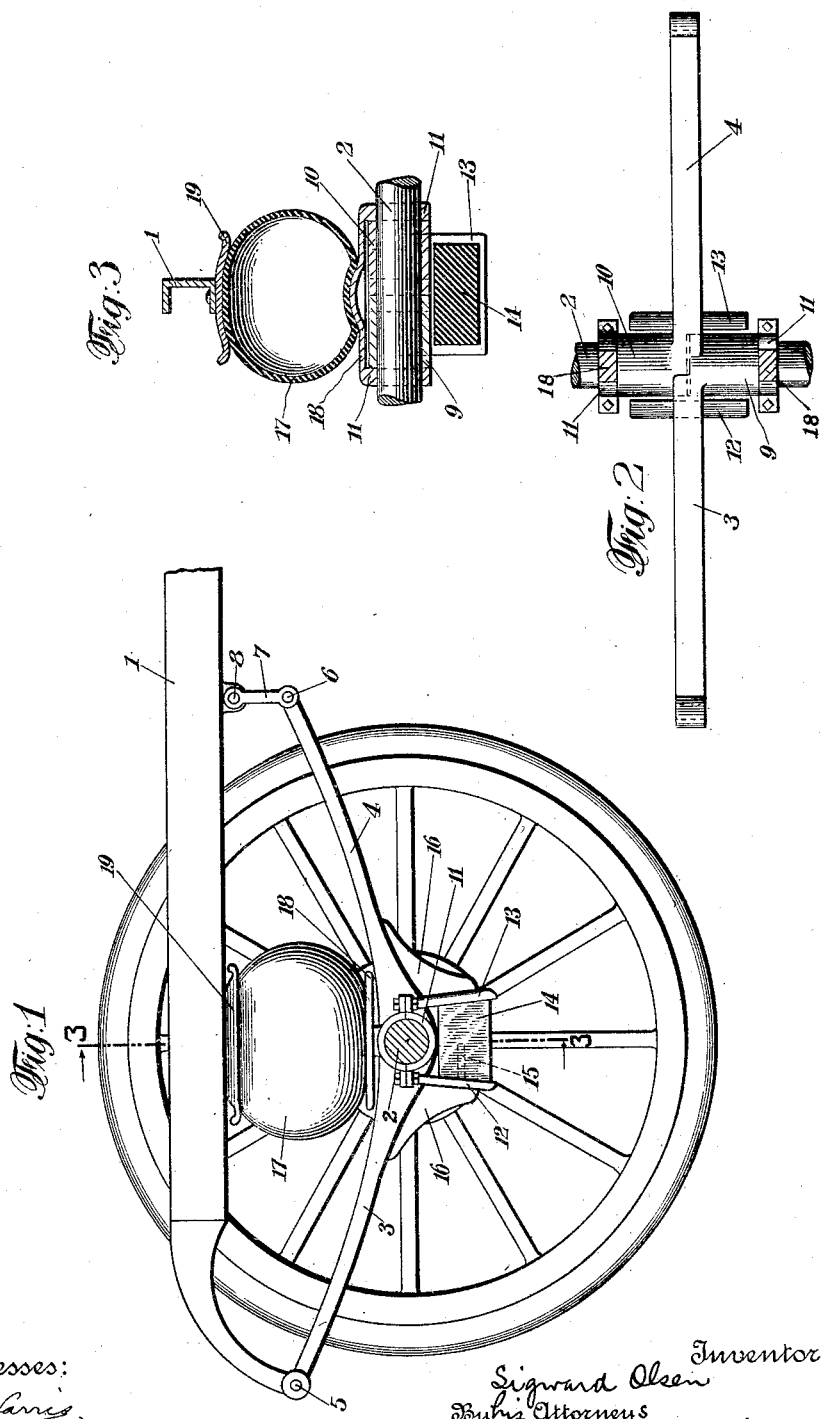

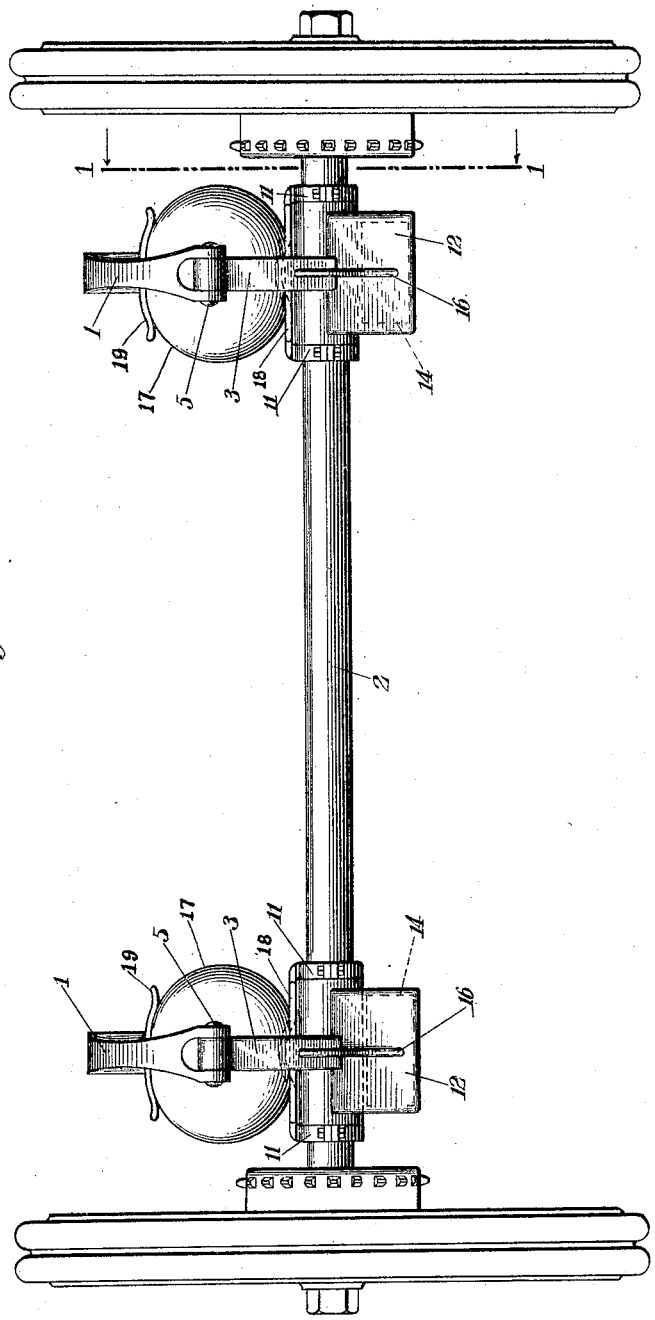

SIGWARD OLSEN, OF NEW YORK, N. Y., ASSIGNOR TO KLENKE CUSHION AXLE COMPANY, A CORPORATION OF NEW YORK.

VEHICLE SUSPENSION.

1,114,284.   Specification of Letters Patent.   Patented Oct. 20, 1914.

Application filed January 5, 1912. Serial No. 669,659.

*To all whom it may concern:*

Be it known that I, SIGWARD OLSEN, a citizen of the United States, and a resident of the county of Kings, borough of Brooklyn, city of New York, have invented certain new and useful Improvements in Vehicle Suspension, of which the following is a specification.

The object of my invention is to provide new and improved means for connecting the body and axle of a vehicle, adapted to permit movement of those two parts toward and away from each other, and to permit a slight longitudinal movement of the two, but preventing lateral displacement or excessive longitudinal displacement, so as to permit of the use of pneumatic bags directly between the body and axle without undue side strains or stresses upon such pneumatic bags.

It consists of the novel combinations and devices herein set forth.

My invention is of peculiar usefulness in automobiles provided with pneumatic bags, but in some of its features, is not limited to that class of vehicle.

In the drawings accompanying this application and forming a part thereof, I have shown my improvement in its preferred form as embodied in an automobile provided with pneumatic bags.

Referring to that embodiment Figure 1 is a section, taken on the lines 1—1 of Fig. 4, showing part of the front axle and body and connecting parts of an automobile. Fig. 2, is a plan of the rods connecting the axle and body and connecting parts. Fig. 3 is a vertical cross-section on the line 3—3 of Fig. 1. Fig. 4 is a front elevation of the front axle.

Referring to this embodiment, 1 is the body or chassis of an automobile, 2 the axle; 3 and 4 are two rigid rods loosely encircling the axle and at their other end so connected to the body at opposite sides of the axle as to permit vertical movement of the body and axle relative to each other. At their upper ends they are pivotally connected to the body, 3 being pivoted to the body at 5, and 4 being pivoted at 6 to link 7 pivoted to the body at 8. The two rods 3 and 4 loosely encircle the axle. As shown, each rod is provided with a sleeve fast with it encircling the axle, rod 3 with sleeve 9 and rod 4 with sleeve 10, the sleeves and rods interlocking with one another as shown in Fig. 2.

11, 11 are collars secured to the axle to prevent lateral movement of the sleeves and rods on the axle. Each sleeve is provided with a downwardly projecting plate integral with it or secured to it. Sleeve 9 has plate 12, and sleeve 10 has plate 13.

14 is a cushioning device, preferably a block of rubber supported between plates 12 and 13. As shown, this is done by bolt 15 passing through plate 12 into block 14. This block is sufficiently compressible between plates 12 and 13 so as to permit rods 3 and 4 and their sleeves to turn on axle 2 as the body and axle move toward each other. Block 14 acts also as a cushioning device during this operation.

16 is a strengthening rib on each downwardly projecting plate.

17 is a pneumatic bag resting on a support 18 fast with collars 11 and thus secured to the axle.

19 is an upper plate fast to the body 1, and resting upon the bag, and transmitting weight from the body to the bag.

By means of my improvement the body and axle are free to move toward and away from each other, being cushioned in this operation not only by the pneumatic bag 17, but also by the compressible blocks 14; all lateral movement or displacement of the body and axle relative to each other is prevented, and a slight, but not excessive longitudinal movement of the body and axle, is permitted. The weight of the body is thus borne by the pneumatic bags and the compressible blocks, and all side or lateral strains through the pneumatic bags are avoided, and any excessive longitudinal strains. For this reason my invention is peculiarly applicable to the use of vehicles provided with pneumatic bags and permits the placing of the latter directly between the axle and the body. The plates 12 and 13 are preferably projected downward, although with suitable changes they could face in another direction.

Other modifications than those heretofore specifically referred to may be made in the specific form shown in the drawings without departing from my invention.

What I claim as new and desire to secure by Letters Patent is:—

1. In the suspension connection between the body and axle of a vehicle the combination of two rods pivotally connected at one end to the body on opposite sides of the axle and at their other ends loosely encircling the axle and provided with projecting plates adapted to move toward and away from each other as the axle and body move toward or away from each other, and a cushioning device supported and compressible between the plates, and adapted to permit a slight longitudinal movement of the body and axle relative to each other, and a pneumatic bag supported by the axle and bearing weight of the body.

2. In the suspension connection between the body and axle of a vehicle the combination of two rods having interlocking sleeves loosely encircling the axle and being so connected at their other ends to the body on opposite sides of the axle as to permit vertical movement of the body and axle relative to each other, two plates projecting from said rods and adapted to move toward and away from each other as the axle and body move toward or away from each other, and a cushioning device supported and compressible between the plates, and adapted to permit a slight longitudinal movement of the body and axle relative to each other, whereby the body and axle, while free to move toward or away from each other, are prevented from lateral movement on each other and are prevented from excessive longitudinal movement on each other and a pneumatic bag directly supported between the axle and the body.

3. In the suspension connection between the body and axle of a vehicle the combination of two rods having interlocking sleeves loosely encircling the axle and being so connected at their other ends to the body on opposite sides of the axle as to permit vertical movement of the body and axle relative to each other, two plates projecting from said rods and adapted to move toward and away from each other as the axle and body move toward or away from each other, and a cushioning device supported and compressible between the plates, and adapted to permit a slight longitudinal movement of the body and axle relative to each other, whereby the body and axle, while free to move toward or away from each other, are prevented from lateral movement on each other and are prevented from excessive longitudinal movement on each other, and collars on the axle to prevent lateral movement of the sleeves on the axle and a pneumatic bag directly supported between the axle and the body.

In testimony whereof, I have signed my name to this specification, in the presence of two subscribing witnesses.

SIGWARD OLSEN.

Witnesses:
  Geo. P. Hotaling,
  William Forster.

---

Copies of this patent may be obtained for five cents each, by addressing the "Commissioner of Patents, Washington, D. C."